(12) United States Patent
Fulghum

(10) Patent No.: US 7,924,909 B2
(45) Date of Patent: Apr. 12, 2011

(54) METHOD AND APPARATUS FOR INTERFERENCE CANCELLATION IN WIRELESS RECEIVERS

(75) Inventor: Tracy L. Fulghum, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1059 days.

(21) Appl. No.: 10/858,787

(22) Filed: Jun. 2, 2004

(65) Prior Publication Data

US 2005/0271123 A1 Dec. 8, 2005

(51) Int. Cl.
   *H04B 1/707* (2011.01)
(52) U.S. Cl. .................. 375/148; 375/147; 375/140
(58) Field of Classification Search .................. 375/148, 375/147, 140
   See application file for complete search history.

(56) References Cited

U.S. PATENT DOCUMENTS

| | | | | |
|---|---|---|---|---|
| 5,488,638 A * | 1/1996 | Kazecki et al. | | 375/347 |
| 5,754,583 A * | 5/1998 | Eberhardt et al. | | 375/147 |
| 5,841,816 A * | 11/1998 | Dent et al. | | 375/331 |
| 5,905,767 A | 5/1999 | Fujimura | | |
| 6,032,033 A * | 2/2000 | Morris et al. | | 455/277.2 |
| 6,282,185 B1 | 8/2001 | Häkkinen et al. | | |
| 6,332,000 B1 * | 12/2001 | Lee | | 375/232 |
| 6,335,954 B1 | 1/2002 | Bottomley et al. | | |
| 6,363,104 B1 | 3/2002 | Bottomley | | |
| 6,505,321 B1 * | 1/2003 | MacLellan et al. | | 714/802 |
| 6,771,692 B2 * | 8/2004 | Rick et al. | | 375/148 |
| 6,967,989 B2 * | 11/2005 | Gorday et al. | | 375/147 |
| 7,106,784 B2 * | 9/2006 | Eltawil et al. | | 375/148 |
| 7,200,196 B2 * | 4/2007 | Li et al. | | 375/355 |
| 2002/0131479 A1 * | 9/2002 | Butler et al. | | 375/147 |
| 2003/0053525 A1 * | 3/2003 | Mehrabani et al. | | 375/148 |
| 2004/0114698 A1 * | 6/2004 | Barrett et al. | | 375/355 |
| 2005/0002451 A1 * | 1/2005 | Yoshihara | | 375/228 |

FOREIGN PATENT DOCUMENTS

| | | |
|---|---|---|
| EP | 0863620 A2 | 9/1998 |
| EP | 0 932 263 | 7/1999 |
| EP | 1 063 778 | 12/2000 |
| EP | 1 130 792 | 9/2001 |
| GB | 2 366 970 | 3/2002 |

OTHER PUBLICATIONS

Kazuhiro O. et al ("New MLSE receiver free from sample timing and input level controls", Vehicular Technology Conference, IEEE May 1993 43rd, NJ, p. 408-411).* H. Arslan et al ("Co-channel interference cancellation with successive cancellation in a narrowband TDMA systems", Wireless Communications and Networking Conference, 2000. WCNC. 2000 IEEE, vol. 3, Chicago, pp. 1070-1077).*

\* cited by examiner

*Primary Examiner* — Shuwang Liu
*Assistant Examiner* — Helene Tayong
(74) *Attorney, Agent, or Firm* — Coats & Bennett, P.L.L.C.

(57) ABSTRACT

A method and apparatus for a multi-branch wireless receiver for periodically sampling first and second received signals corresponding to first and second receiver branches at first and second sample times to generate offset sample streams. The offset sample streams are then combined in a combining circuit to reduce interference present in the received signals. In an exemplary embodiment, a multi-branch wireless receiver includes an offset circuit to generate first and second offset sample times. A first sampler periodically samples the first received signal at the first sample time to generate a first sample stream and a second sampler periodically samples the second received signal at the second sample time to generate a second sample stream offset from the first sample stream. The combining circuit comprises a RAKE receiver that reduces the interference by scaling and combining despread values generated from the offset sample streams.

44 Claims, 11 Drawing Sheets

METHOD AND APPARATUS FOR INTERFERENCE CANCELLATION IN WIRELESS RECEIVERS

BACKGROUND OF THE INVENTION

The present invention generally relates to processing received communication signals and particularly relates to reducing interference present in the received communication signals.

In many CDMA (Code Division Multiple Access) systems, the downlink spread spectrum signal is composed of multiple user signals that were spread with spreading codes designed to be orthogonal. As a result, when the channel is flat, the combined transmit and receive filters have a Nyquist pulse shape, and an ideal sample time is used, interfering components are not seen at the output of the demodulator. In general, the ideal sample time used to produce the samples coincides with the point in the Nyquist pulse that does not incur interference from adjacent pulses. In the case of a CDMA system, the adjacent pulses are the chips which make up the received symbol. If the actual sample time deviates from the ideal sample time, then the orthogonality of the multi-user signals is lost in the processing, and multi-user interference appears at the output of the demodulator.

Because the receiver does not know where the ideal sample times are relative to the received signal, conventional receivers typically over-sample the received signal and select the sample time corresponding to the best sample as the "ideal" sample time. For example, a wideband wireless receiver in a WCDMA (Wideband Code Division Multiple Access) system may over-sample the received signal at a sample rate equal to four times the chip rate, (four samples per chip). In order to produce the chip-spaced (or chip rate) samples for despreading, the wireless receiver selects the chip-spaced samples in the oversampled sample stream which are sampled closest to the ideal sample time. E.g., suppose succeeding samples in a four times oversampled sample stream modulo 4 are numbered as 0, 1, 2, 3, 0, 1, 2, 3, 0, 1, 2, 3, etc. Further, suppose that the sample time of the number 2 samples is closest to the ideal sample time of the chip pulses. In this scenario, the sample time corresponding to the number 2 samples is chosen as the best sampling time.

However, because of the limited number of samples, even the best sampling time may be offset from the ideal sample time by some amount, referred to herein as sample time error. In the over-sampled WCDMA example above, the sample time error may be as much as $T_s/2$, where $T_s$ represents the sample period. Because the samples are acquired using non-ideal sample times, the orthogonality between users has been compromised, causing the samples to include interference from adjacent pulses. As a result, the sample time error typically degrades the overall performance of the receiver.

SUMMARY OF THE INVENTION

The present invention comprises a method and apparatus for reducing interference in a multi-branch wireless receiver by time offsetting samples generated for each receiver branch signal. According to the present invention, the multi-branch wireless receiver comprises a sampling circuit and a combining circuit. The sampling circuit periodically samples the received signals to generate offset sample streams. The offset sample streams are combined in a combining circuit to reduce the interference caused by the timing error.

In an exemplary embodiment, the sampling circuit includes samplers and an offset circuit. A first sampler periodically samples a first received signal at a first sample time to generate a first sample stream. A second sampler periodically samples a second received signal at a second sample time to generate a second sample stream offset from the first sample stream. An exemplary combining circuit reduces the interference by scaling and combining despread values generated from the offset sample streams.

DETAILED DESCRIPTION OF THE INVENTION

Figure 1A:
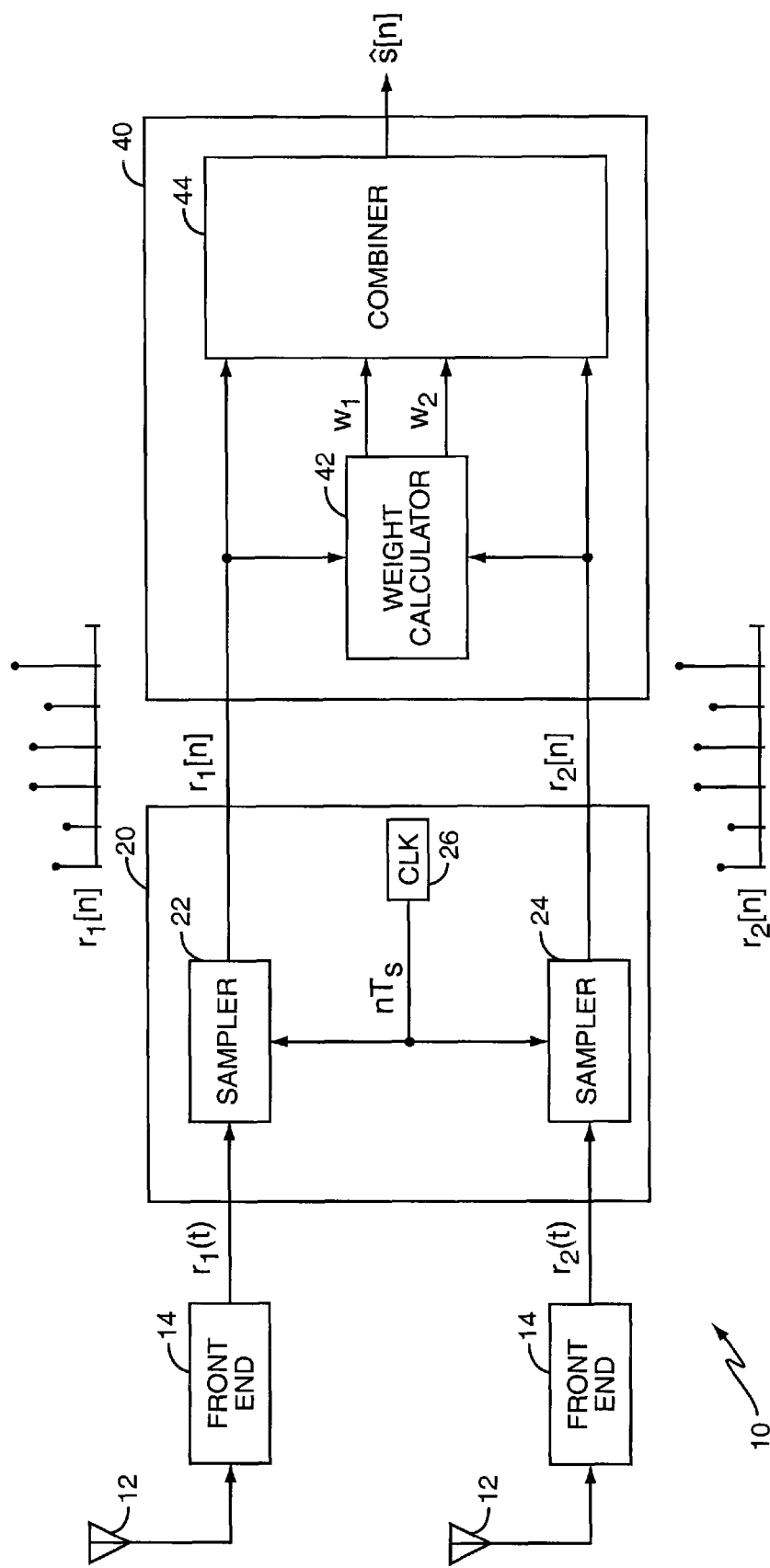
FIG. 1A illustrates a block diagram of a conventional two-branch wireless receiver.
Figure 1B:
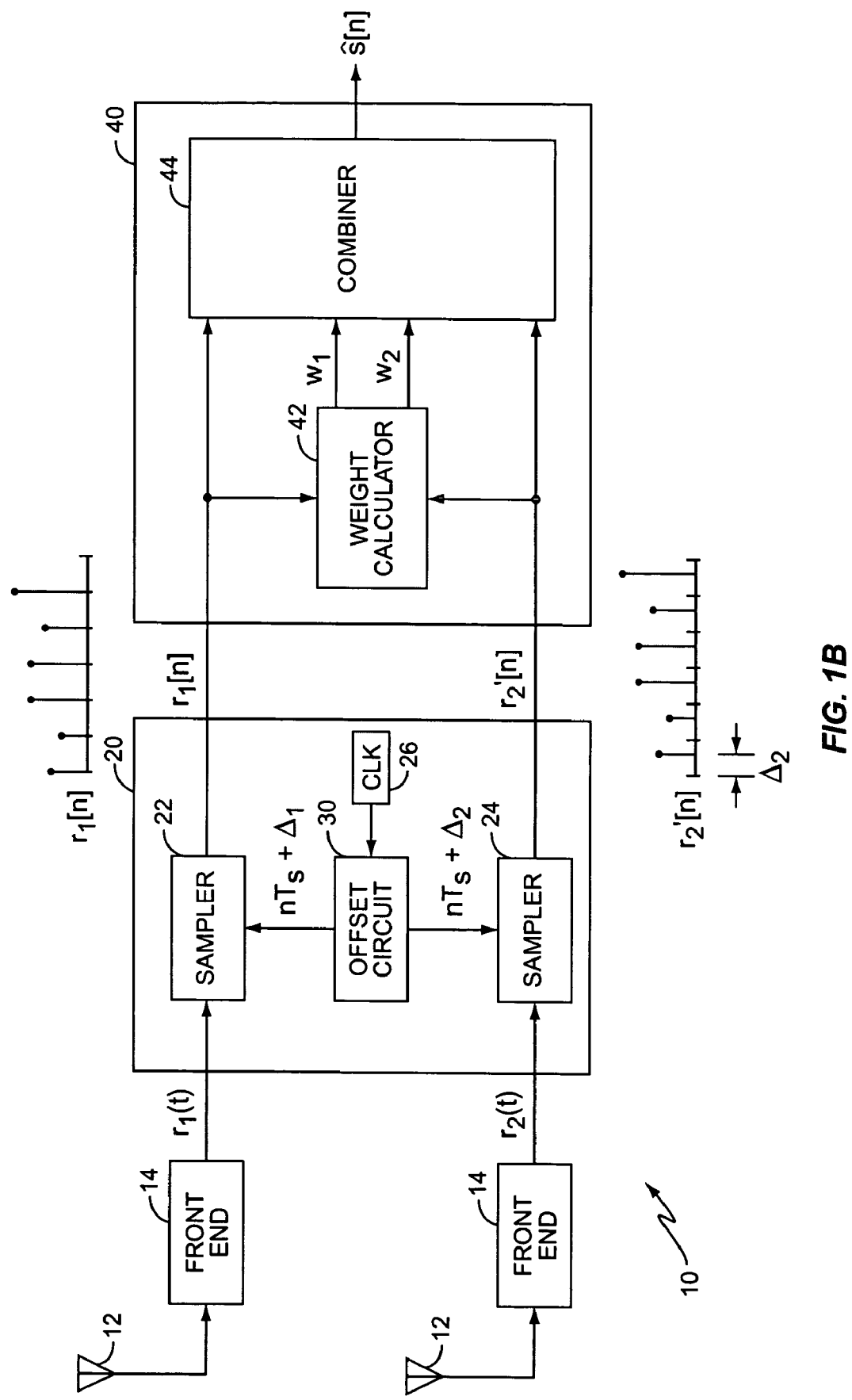
FIG. 1B illustrates an exemplary embodiment of a two-branch wireless receiver according to the present invention.

FIGS. 1A and 1B illustrate an exemplary two-branch wireless receiver 10 that may be part of a base station and/or a mobile station within a wireless network. As used herein the term "mobile station" may include cellular telephones, satellite telephones, personal communication services (PCS) devices, personal data assistants (PDAs), palm-top computers, laptop computers, pagers, and the like. While only two branches are shown for simplicity, it will be appreciated that the illustrated receiver may be generalized to include more than two branches.

The multi-branch wireless receiver 10 includes two separate antennas 12, corresponding front-ends 14, a sampling circuit 20, and a combining circuit 40. Antennas 12 receive radio signals from a base station and/or a mobile station, as is well understood in the art. For a flat channel, front-ends 14 process the radio signals received at antennas 12 to generate m=1, 2 complex baseband signals $r_1(t)$ and $r_2(t)$, represented generally as:

$$r_m(t) = \underbrace{c_m \sum_i s_i g(t - iT)}_{\text{received signal}} + \underbrace{N_m(t)}_{\text{Gaussian Noise}}. \quad \text{(Eq .1)}$$

As shown in Equation 1, the received signal $r_m(t)$, where m indexes each of the M receiver branches, comprises complex Gaussian noise $N_m(t)$ and a series of Nyquist shaped pulses $g(t)$, scaled by $c_m$ and $s_i$. Here, $c_m$ is a complex coefficient imparted by the radio channel between the transmitter and the $m^{th}$ antenna 12, and $s_i$ is a complex number imparted on the pulse by the transmitter. In a narrowband system, $s_i$ represents the symbol sent by the transmitter and T is the symbol interval. In describing a wideband CDMA system, $s_i$ represents one of the many chips that make up a symbol, and T is the chip interval. A narrowband system can alternately be thought of as a CDMA system with one chip per symbol.

The resulting M signals, represented by $r_m(t)$, are provided to sampling circuit 20. Sampling circuit 20 includes a first sampler 22 and a second sampler 24 sharing a common sampling clock 26. First sampler 22 and second sampler 24 periodically sample the respective received signals at common sample times $nT_s$ to produce a first sample stream $r_1[n]$ and a second sample stream $r_2[n]$. As discussed above, when the sample times $nT_s$ provided by sample clock 26 differ from the ideal sample time, a sample time error $\epsilon$ is created. To better appreciate how sample time error $\epsilon$ affects receiver performance, consider the following mathematical analysis.

Equation 2 represents a sample stream for the $m^{th}$ receiver branch having a sample time error $\epsilon$:

$$r_m[n] = c_m \sum_i s_i g[nT_s + \varepsilon - iT] + N_m[nT_s + \varepsilon], \quad \text{(Eq. 2)}$$

where $g[x]$ = sampled Nyquist pulse $$= \begin{cases} 1, & x = 0 \\ 0, & x = \text{non-zero integer} \\ \text{anything}, & x = \text{non-zero, non-integer} \end{cases}$$

In a single-user signal, sample streams that include a sample time error $\epsilon$ typically include pulse ringing from adjacent pulses, and therefore, include inter-pulse interference (IPI). Because all received signals $r_m(t)$ in a conventional M-branch receiver are periodically sampled at the same sample times $nT_s$, the first and second samplers 22, 24 produce samples with the same sample time error $\epsilon$, as shown in Equation 3:

$$r_1[0] = \underbrace{c_1 s_0 g(\varepsilon)}_{\text{desired signal}} + \underbrace{c_1 \sum_{i \neq 0} s_i g[\varepsilon - iT]}_{\text{IPI}} + \underbrace{N_1[\varepsilon]}_{\text{thermal noise}}, \quad \text{(Eq. 3)}$$

$$r_2[0] = \underbrace{c_2 s_0 g(\varepsilon)}_{\text{desired signal}} + \underbrace{c_2 \sum_{i \neq 0} s_i g[\varepsilon - iT]}_{\text{IPI}} + \underbrace{N_2[\varepsilon]}_{\text{thermal noise}}$$

where sample n=0 is arbitrarily selected as the "best" sample for purposes of the mathematical analysis. As a result, both samples include the same relative IPI.

When $\epsilon=0$, the Nyquist pulse $g[iT]$, by definition (Equation 2), is zero for all non-zero integer values of $i$. Therefore, Equation 3 may be rewritten as:

$$r_m[0] = \underbrace{c_m s_0 g(\varepsilon)}_{\text{desired signal}} + \underbrace{c_m v(\varepsilon)}_{\text{IPI}} + \underbrace{N_m[\varepsilon]}_{\text{thermal noise}} \quad \text{(Eq. 4)}$$

where, $\begin{cases} v(0) = 0 \text{ for ideal Nyquist Pulse}, \\ v(\varepsilon) = \sum_{i \neq 0} s_i g[\varepsilon - iT] \text{ otherwise} \end{cases}$ Because in high signal strength conditions the IPI dominates the thermal noise in single user signals, Equation 4 may be further simplified to:

$$r_m[0] \cong \underbrace{c_m s_0 g(\varepsilon)}_{\text{desired signal}} + \underbrace{c_m v(\varepsilon)}_{\text{IPI}}. \quad \text{(Eq. 5)}$$

For a two branch wireless receiver 10, two resulting samples may be written as:

$$r_1[0] \cong c_1 s_0 g(\epsilon) + c_1 v(\epsilon) \text{ and}$$

$$r_2[0] \cong c_2 s_0 g(\epsilon) + c_2 v(\epsilon) \quad \text{(Eq. 6)}$$

Those skilled in the art will appreciate that because $r_1[0]$ and $r_2[0]$ both have the same sample time error $\epsilon$, and therefore the same IPI, combining scaled versions of $r_1[0]$ and $r_2[0]$ will not cancel the IPI without also equally canceling the desired signal $s_0$.

To reduce the IPI, the present invention modifies sampling circuit 20 of FIG. 1A to include offset circuit 30, shown in FIG. 1B, to offset in time the samples of the second sample stream $r_2[n]$ from the samples of the first sample stream $r_1[n]$. The resulting sample streams are referred to herein as offset sample streams, where offset, as used herein, is understood to mean time offset.

As shown in FIG. 1B, first sampler 22 periodically samples the first received signal $r_1(t)$ at first sample times $nT_s + \Delta_1$ to generate the first sample stream, while second sampler 24 periodically samples the second received signal $r_2(t)$ at second sample times $nT_s + \Delta_2$ to generate a second sample stream time offset from the first sample stream. For an M-branch receiver, these sample streams are generally described by:

$$r_m[n] = c_m \sum_i s_i g[nT_s + \Delta_m + \varepsilon - iT] + N_m[nT_s + \Delta_m + \varepsilon] \quad \text{(Eq. 7)}$$

where $\Delta_m$ represents the time offset of branch m with respect to the first branch. Because delays are defined with respect to branch 1, then $\Delta_1 = 0$ by definition, and the samples described by Equation 6 become:

$$r_1[0] \cong c_1 s_0 g(\epsilon) + c_1 v(\epsilon), \text{ and}$$

$$r'_2[0] \cong c_2 s_0 g(\epsilon + \Delta_2) + c_2 v(\epsilon + \Delta_2). \quad \text{(Eq. 8)}$$

In exemplary embodiments, the time offset $\Delta_2$ is preferably $T_s/2$ for a two-branch wireless receiver 10. However, those skilled in the art will appreciate that time offset $\Delta_2$ may be any fraction of the original sample period $T_s$. Although $v(\epsilon)$ and $v(\epsilon + \Delta_2)$ of Equation 8 may be highly correlated, they are not equivalent. As a result, combining scaled versions of the offset samples $r_1[0]$ and $r'_2[0]$ according to conventional combining methods, such as Minimum Mean Square Error (MMSE), Maximum Likelihood (ML), etc., reduces the IPI due to the sample time error $\epsilon$ without reducing the desired signal $s_0$.

The above analysis assumes the received signals $r_1(t)$ and $r_2(t)$ are single user signals and applies to both narrowband single user signals and CDMA single user signals. However, the same general analysis applies equally well to multi-user CDMA signals using orthogonal spreading codes (e.g., WCDMA system signals), in which the multiple chips that make up a symbol are despread using the sampled signals. Equation 9 represents the despread output of a despreader on the $m^{th}$ branch of a conventional wireless receiver:

$$Y_m[0] = \underbrace{c_m X[\varepsilon]}_{\text{despread symbol estimate}} + \underbrace{c_m Z[\varepsilon]}_{\text{MUI}} + \underbrace{N_m[\varepsilon]}_{\text{thermal noise}} \quad \text{(Eq. 9)}$$

where, $\begin{cases} Z(0) = 0 \\ Z(\varepsilon) = \text{anything for } \varepsilon \neq 0 \end{cases}$, where $c_m Z(\epsilon)$ represents Multi-User Interference (MUI) arising in the despreader output for the desired user due to the sample time error $\epsilon$, $c_m X[\epsilon]$ is the estimate of the despread symbol from the sample stream, and $N_m[\epsilon]$ is the output of the despreader due to Gaussian noise. When sampling circuit 20 introduces sample time error $\epsilon$ in CDMA multi-user signals, for example, the despread values from the sample streams corresponding to different users are no longer orthogonal when despread. The violation of the orthogonality criteria results in MUI. Because MUI dominates over both IPI and thermal noise, Equation 9 may be rewritten as:

$$Y_m[0] \cong \underbrace{c_m X[\varepsilon]}_{desired\ signal} + \underbrace{c_m Z[\varepsilon]}_{MUI}. \qquad \text{(Eq. 10)}$$

As with the single user signals, interference due to sample time error $\epsilon$ in multi-user signals may be reduced by using offset circuit 30 to produce offset sample streams $r_1[n]$ and $r'_2[n]$ from which the despread values $X[\epsilon]$ and $X[\epsilon+\Delta_2]$, shown in Equation 11, are produced.

$$Y_1[0] \cong c_1 X[\epsilon] + c_1 Z[\epsilon]$$

$$Y_2'[0] \cong c_2 X[\epsilon+\Delta_2] + c_2 Z[\epsilon+\Delta_2] \qquad \text{(Eq. 11)}$$

Figure 2B:
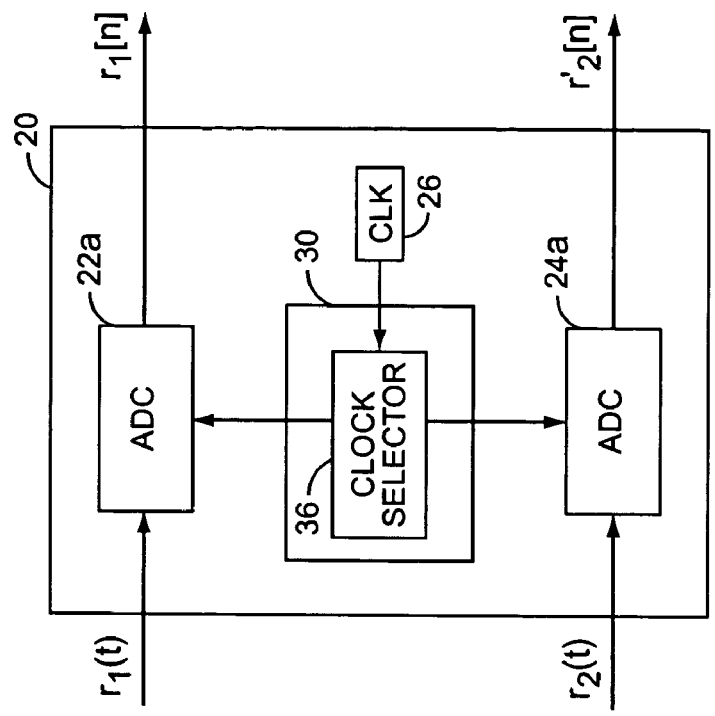
FIGS. 2A-2D illustrate exemplary sampling circuits for the wireless receiver of FIG. 1.
Figure 2A:
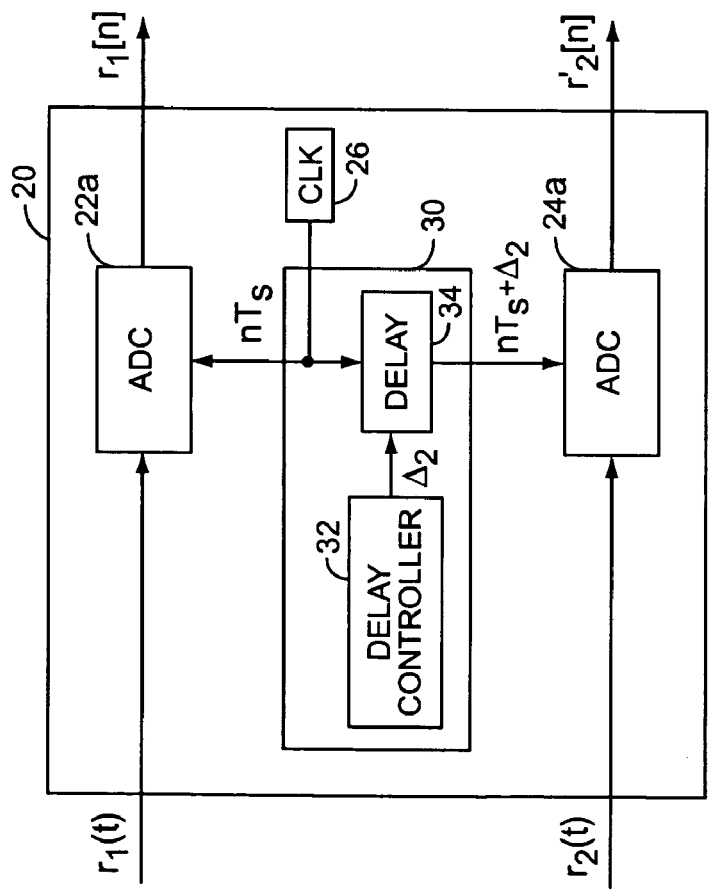

As discussed above, samplers 22, 24 in sampling circuit 20 generate first and second offset sample streams $r_1[n]$ and $r'_2[n]$, which may be generated according to any desired means. In an exemplary embodiment, the samplers 22, 24 may comprise flash analog-to-digital converters (ADC), where the timing of the analog-to-digital conversion is controlled to induce the necessary timing offset between the sample streams, as shown in FIGS. 2A and 2B. Alternatively, samplers 22, 24 may comprise oversample and decimate systems, as shown in FIG. 2C, which include oversampling ADC's, such as sigma-delta ADCs, followed by decimator/filter circuits. If the same filtering and decimation techniques are applied to the highly oversampled streams, the two resulting sample streams will incur the same timing error, $\epsilon$. Thus the decimation and/or filtering step performed on one of the highly oversampled streams may be adjusted to include an additional delay (time offset), $\Delta_2$, which results in the lower rate output sample streams, $r_1[n]$ and $r'_2[n]$, being offset in time. Additionally, by delaying one of the received signals before sampling as in FIG. 2D, sampling circuit may generate offset sample streams using a common clock signal. In this case, the ADC may be flash ADC or an over sample and decimate system.

FIGS. 2A-2D, which illustrate exemplary sampling circuits 20 according to the present invention, will now be discussed in more detail. FIG. 2A illustrates an exemplary sampling circuit 20 that uses ADCs 22a, 24a to generate the offset sample streams. The first ADC 22a in FIG. 2A generates the first sample stream $r_1[n]$ by periodically sampling the received signal $r_1(t)$ at sample times $nT_s$ provided by clock 26. To generate the offset second sample stream $r'_2[n]$, offset circuit 30 uses delay controller 32 to define the desired delay $\Delta_2$. Delay element 34 then applies the desired delay $\Delta_2$ to the clock signal to generate offset sample times $nT_s+\Delta_2$, which are used by the second ADC 24a to generate the offset second sample stream $r'_2[n]$. As a result, samples of the second sample stream $r'_2[n]$ are offset from the samples of first sample stream $r_1$, [n] by the time offset $\Delta_2$.

FIG. 2B shows another exemplary sampling circuit 20 according to the present invention. In this embodiment, offset circuit 30 includes clock selector 36 for selecting offset sample times from the clock signal generated by clock 26. In one embodiment, clock selector 36 may trigger the first and second ADCs at different edges of the clock signal. For example, clock selector 36 may trigger the first ADC 22a to sample the first received signal $r_1(t)$ at a negative edge of the clock signal provided by clock 26, while triggering the second ADC 24a to sample the second received signal $r_2(t)$ at a positive edge of the clock signal provided by clock 26. In this embodiment, clock selector 36 may include an inverter (not shown) that enables the second ADC 24a to sample at sample times offset by $T_s/2$ from the sample times used by the first ADC 22a.

Alternatively, sampling clock 26 may increase the sample rate to provide $M(nT_s)$ sample times to offset circuit 30. For example, the sampling clock 26 of a two-branch wireless receiver 10 (m=1, 2) may provide twice as many sample times $nT_s$ to offset circuit 30. In this embodiment, clock selector 36 generates the offset sample times by, for example, providing all even sample times $2T_s$, $4T_s$, $6T_s$, etc., from clock 26 to the first ADC 22a and all odd sample times $T_s$, $3T_s$, $5T_s$, etc., from clock 26 to the second ADC 24a. As a result, the sample streams generated by the first and second ADCs 22a, 24a are time offset by $\Delta_2 = T_s/2$.

Those skilled in the art will appreciate that when wireless receiver 10 includes more than m=2 branches, clock selector 36 may select the sample times for each branch according to any known selection process. For example, for a four branch receiver 10, clock 26 provides four times as many sample times n $T_s$ to clock selector 26. To generate the offset sample streams, clock selector 36 may select from clock 26 the $T_s$, $5T_s$, $9T_s$, etc., sample times for the first branch, the $2T_s$, $6T_s$, $10T_s$, etc., sample times for the second branch, the $3T_s$, $7T_s$, $11T_s$, etc., sample times for the third branch, and the $4T_s$, $8T_s$, $12T_s$, etc., sample times for the fourth branch.

Still another exemplary sampling circuit 20 according to the present invention is shown in FIG. 2C. In the sampling circuit 20 of FIG. 2C, samplers 22, 24 comprise oversample and decimator systems 22b, 24b that each include an oversampling ADC and a decimator/filter circuit. The first oversample and decimator system 22b generates the first sample stream $r_1[n]$ by periodically sampling the first received signal $r_1(t)$ in the oversampling ADC at a common oversampling rate to generate a first oversampled stream of samples. The decimator/filter circuit then filters and periodically downsamples the first oversampled stream of samples at a predetermined downsample rate to generate the first sample stream $r_1[n]$.

To generate the offset second sample stream $r'_2[n]$, the second oversample and decimator system 24b periodically samples the second received signal in the over sampling ADC at a common oversampling rate to generate a second oversampled stream of samples. Delay controller 32 of offset circuit 30 then applies an offset time $\Delta_2$ to decimator/filter circuit 38 to generate the offset second sample stream $r'_2[n]$. In the illustrated embodiment, decimator/filter circuit 38 typically differs from the decimator/filter circuit in the first oversample and decimator system 22b.

The delay controller 32 may provide the time offset $\Delta_2$ to the filter portion of the decimator/filter circuit 38, which offsets the second oversampled stream of samples. In this embodiment, the decimator periodically downsamples the offset sample stream at a predetermined downsample rate to generate the offset second sample stream $r'_2[n]$. Alternatively, delay controller 32 may provide the time offset $\Delta_2$ to the decimator portion of decimator/filter circuit 38 to offset the downsampling rate of the decimator. In this embodiment, the decimator/filter circuit 38 filters the second oversampled stream of samples and periodically downsamples the second oversampled stream of samples at an offset downsample rate to generate the offset second sample stream $r'_2[n]$. In any event, the samples of the offset second sample stream $r'_2[n]$ are offset from the samples of the first sample stream $r_1[n]$ by the time offset $\Delta_2$.

Figure 2D:
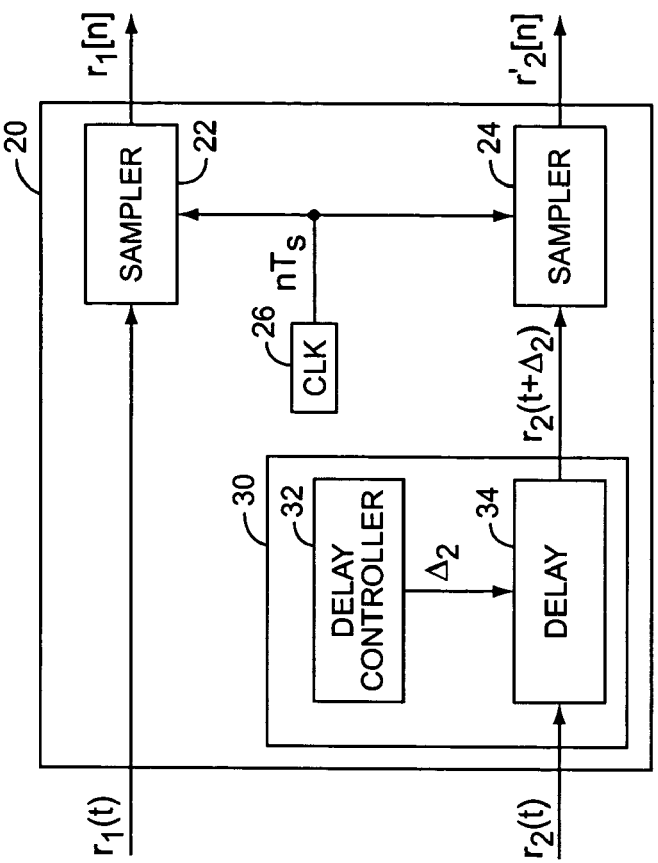
Figure 2C:
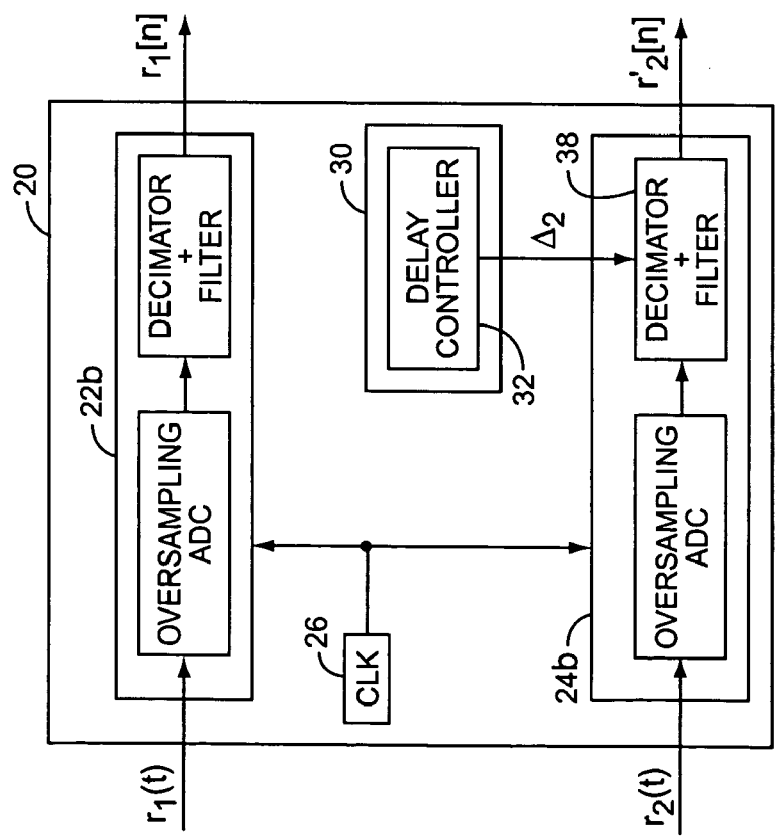

The present invention may also be implemented by offsetting the second received signal $r_2(t)$ prior to sampling the second received signal $r_2(t)$, as shown in sampling circuit 20 of FIG. 2D. In this embodiment, offset circuit 30 may offset the second received signal $r_2(t)$ using delay controller 32 and delay element 34. Delay controller 32 defines the delay $\Delta_2$, while delay element 34 offsets the second received signal $r_2(t)$ to generate an offset received signal $r_2(t+\Delta_2)$ based on the defined delay. Samplers 22, 24 then periodically sample the first received signal and the offset received signal $r_2(t+\Delta_2)$, respectively, at sample times $nT_s$ to generate the offset sample streams.

FIGS. 2A-2D illustrate exemplary embodiments of sampling circuits 20 for the multi-branch wireless receiver 10 of FIG. 1B. While specific samplers are shown in each embodiment, those skilled in the art will appreciate that the present invention does not limit a specific sampling circuit embodiment to the illustrated samplers; any samplers that generate time offset sample streams may be used with the present invention.

Turning back to FIG. 1B, sampling circuit 20 provides the offset sample streams $r_1[n]$ and $r'_2[n]$ to combining circuit 40. Combining circuit 40 includes a weight calculator 42 and a combiner 44 that use Maximum Likelihood (ML) or Minimum Mean Squared Error (MMSE) processes to weight and combine the offset sample streams $r_1[n]$ and $r'_2[n]$ to maximize the signal-to-noise ratio (SNR) of the combined output symbol/chip $\hat{s}[n]$ and therefore, to cancel interference, including IPI and MUI.

Figure 3:
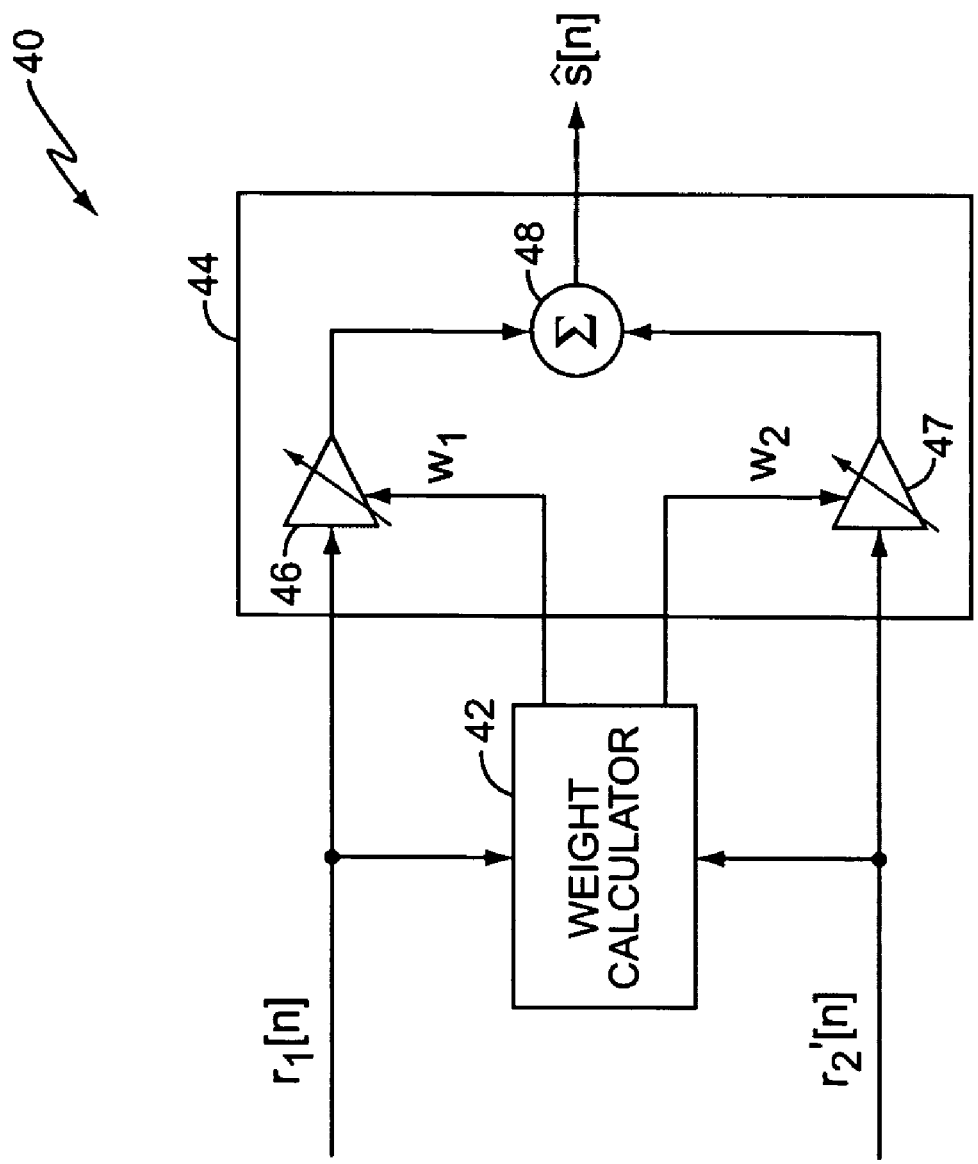
FIG. 3 illustrates an exemplary combining circuit for the wireless receiver of FIG. 1.

Combining circuit 40 may be any known combining circuit that weights and combines the offset sample streams $r_1[n]$ and $r'_2[n]$ to reduce interference. An exemplary combining circuit 40 is shown in FIG. 3. Based on the offset sample streams $r_1[n]$ and $r'_2[n]$, weight calculator 42 calculates complex weighting factors $w_1$ and $w_2$ according to any conventional technique, such as MMSE or ML. A variable scaling multiplier 46 scales the first sample stream $r_1[n]$ by weighting factor $w_1$. Similarly, variable scaling multiplier 47 scales the offset second sample stream $r'_2[n]$ by weighting factor $w_2$. Summer 48 sums the scaled offset sample streams $w_1 r_1[n]$ and $w_2 r'_2[n]$ to cancel interference, including MUI and IPI, and to generate the combined output symbol $\hat{s}[n]$.

Figure 4:
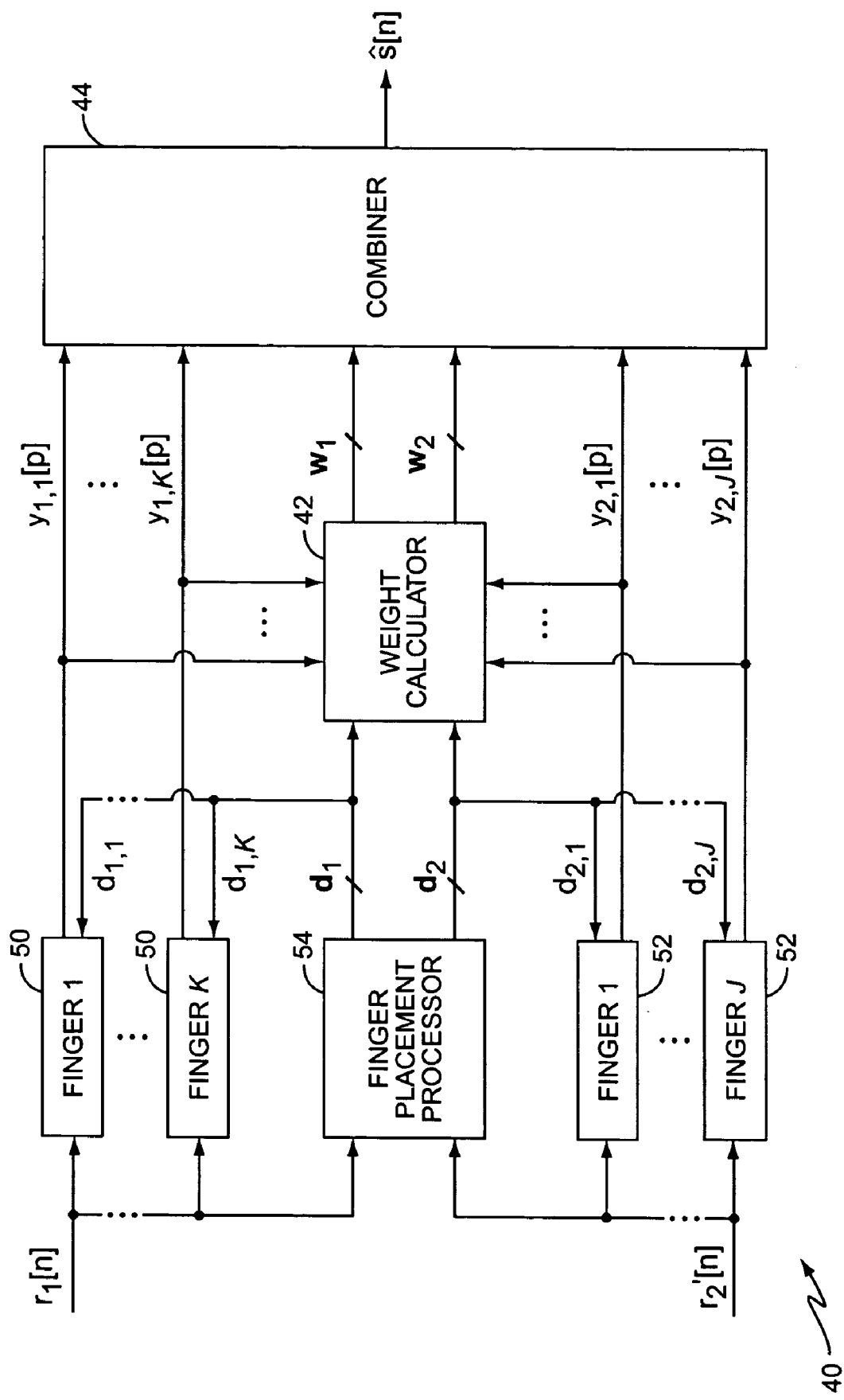
FIG. 4 illustrates another exemplary combining circuit for the wireless receiver of FIG. 1.

In another exemplary embodiment, shown in FIG. 4, combining circuit 40 comprises RAKE combining circuit 40, such as a RAKE receiver. In addition to the weight calculator 42 and the combiner 44, RAKE combining circuit 40 includes a first set of RAKE fingers 50, a second set of RAKE fingers 52, and a finger placement processor 54. Based on the first sample stream $r_1[n]$, finger placement processor 54 identifies and selects a vector of one or more delays $d_1$ corresponding to K signal images received by first antenna 12. Each selected delay $d_{1,1} \ldots d_{1,K}$ is provided to a different RAKE finger 50. RAKE fingers 50 despread and correlate one or more user signals present in the first sample stream $r_1[n]$, based on the provided delays $d_{1,1} \ldots d_{1,K}$, to produce a set of K despread sample streams $y_{1,1}[p] \ldots y_{1,K}[p]$ corresponding to the K images of the user signal(s) present in the first sample stream $r_1[n]$.

Similarly, finger placement processor 54 identifies and selects a vector of one or more delays $d_2$ based on the offset second sample stream $r'_2[n]$. Each selected delay $d_{1,1} \ldots d_{1,J}$ is provided to a different RAKE finger 52. RAKE fingers 52 despread and correlate one or more user signals present in the offset second sample stream $r'_2[n]$, based on the provided delays $d_{1,1} \ldots d_{1,J}$, to produce a set of J despread values $y_{2,1}[p] \ldots y_{2,J}[p]$ corresponding to the J images of the user signal(s) present in the offset second sample stream $r'_2[n]$.

The selected delays $d_1$ and $d_2$, along with the offset sample streams $r_1[n]$ and $r'_2[n]$, are provided to weight calculator 42 for computing vectors of weighting factors $w_1$ for the first sample stream $r_1[n]$ and $w_2$ for the offset second sample stream $r'_2[n]$. Combiner 44 receives the despread values $y_{1,1}[p] \ldots y_{1,K}[p]$ and $y_{2,1}[p] \ldots y_{2,J}[p]$ and the corresponding weighting factors $w_1$ and $W_2$, and cancels interference, including MUI and IPI, by weighting and coherently combining the despread values $y_{1,1}[p] \ldots y_{1,K}[p]$ and $y_{2,1}[p] \ldots y_{2,J}[p]$ according to methods known in the art to generate the output symbol estimate $\hat{s}[n]$.

Figure 5:
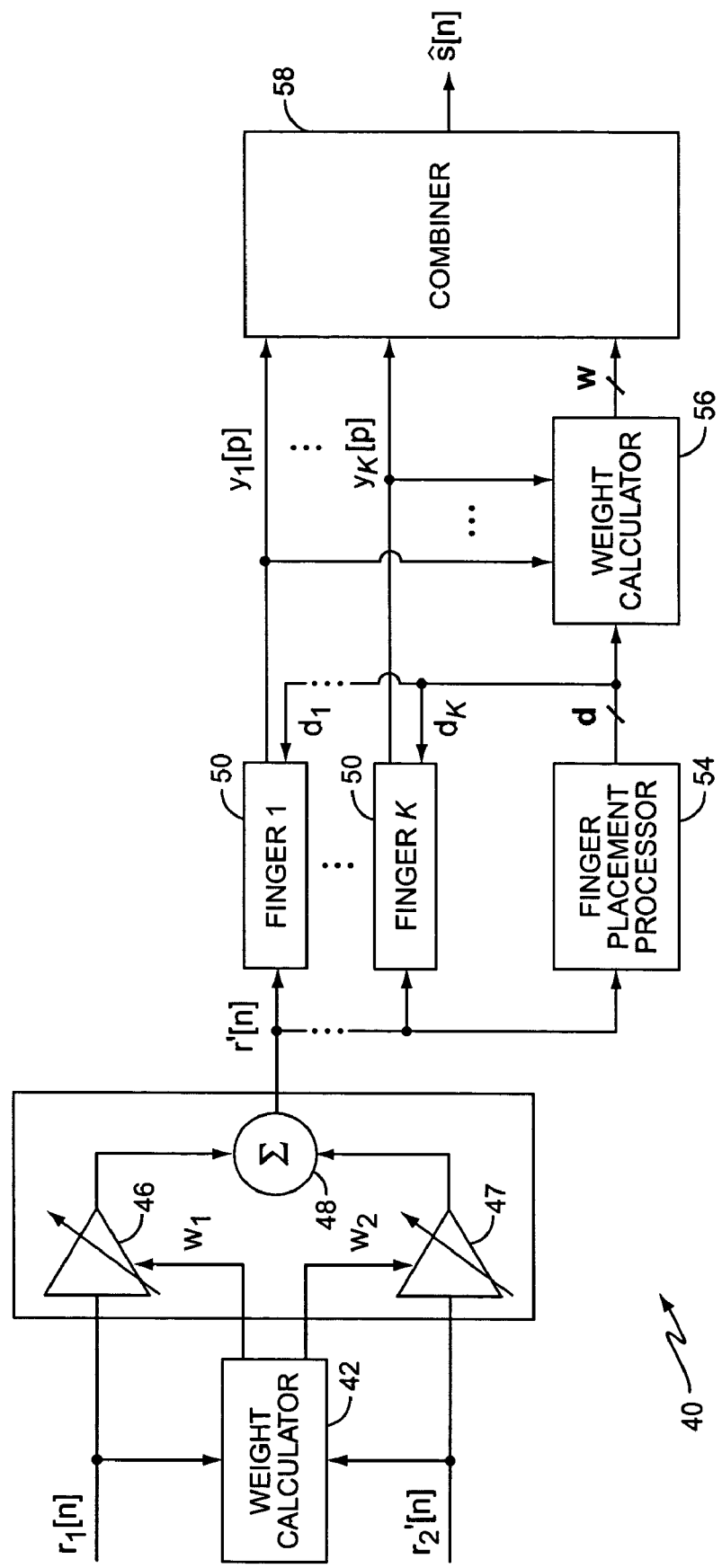
FIG. 5 illustrates another exemplary combining circuit for the wireless receiver of FIG. 1.

In an alternate embodiment, the offset sample streams may be combined before being input to a RAKE combining circuit, as shown in FIG. 5. In the combining circuit 40 shown in FIG. 5, weight calculator 42 calculates complex weighting factors $w_1$ and $w_2$ according to any conventional technique, such as MMSE or ML. Variable scaling multipliers 46, 47 scale the offset sample streams $r_1[n]$ and $r'_2[n]$ by weighting factors $w_1$ and $w_2$, respectively. Summer 48 sums the scaled offset sample streams $w_1 r_1[n]$ and $w_2 r'_2[n]$ to cancel interference, including MUI and IPI, to generate a combined sample stream $r'[n]$.

The combined sample stream $r'[n]$ is then input into a RAKE combining circuit, which comprises a set of RAKE fingers 50, a finger placement processor 54, a weight calculator 56, and a RAKE combiner 58. Based on the combined sample stream $r'[n]$, finger placement processor 54 identifies and selects a vector of one or more delays d corresponding to the K signal images associated with the combined sample stream $r'[n]$. Each selected delay $d_1 \ldots d_K$ is provided to a different RAKE finger 50. RAKE fingers 50 despread and correlate one or more user signals present in the combined sample stream $r'[n]$, based on the provided delays $d_1 \ldots d_K$, to produce a set of K despread sample streams $y_{1,1}[p] \ldots y_{1,K}[p]$ corresponding to the K images of the user signal(s) present in the combined sample stream $r'[n]$.

The selected delays $d_1 \ldots d_K$, along with the combined sample stream $r'[n]$ is provided to weight calculator 56 for computing a vector of weighting factors w for the combined sample stream $r'[n]$. Combiner 58 receives the despread values $y_{1,1}[p] \ldots y_{1,K}[p]$ and the corresponding weighting factors w and coherently combines the despread values $y_{1,1}[p] \ldots y_{1,K}[p]$ according to methods known in the art to generate the output symbol estimate $\hat{s}[n]$. Both embodiments shown in FIGS. 4 and 5 illustrate a RAKE combining circuit that uses the despread values to generate the weighting factors. However it will be appreciated by those skilled in the art that the weighting factors may instead be generated based on the offset sample streams (FIG. 4) and the combined sample stream (FIG. 5).

The above describes a method and apparatus for canceling interference from signals received at a wireless receiver 10. The receiver 10 of the present invention may be used in narrowband systems i.e., CDMA systems, where the timing error generally causes Inter-Symbol Interference (ISI), or wideband systems, i.e., WCDMA systems, where the timing error generally causes Inter-Chip Interference (ICI). Further, those skilled in the art will appreciate that the sampling need not be done at baseband. The offset sample streams may also be generated from RF or IF signals. In any event, receiver 10 of the present invention reduces the ISI and the ICI caused by the timing error, and therefore, improves the overall performance of the receiver 10.

While the above is described in terms of a two-branch wireless receiver 10, those skilled in the art will appreciate that the present invention may be applied to a wireless receiver 10 with two or more receiver branches that receives signals via two or more antennas 12. The resulting multi-branch wireless receiver 10 periodically samples the received signal in a first receiver branch to generate a first sample stream, while also periodically sampling the received signal(s) in one or more of the remaining receiver branches to generate sample stream(s) offset from the first sample stream. Some embodiments of the present invention may apply a different offset to each of the signals sampled in the remaining receiver branches. For example a sampling circuit 20 in a four-branch wireless receiver 10 may successively offset each branch by $T_s/4$. As a result, $T_s/4$, $T_s/2$, and $3T_s/4$ offset the sample streams generated by three of the receiver branches from the first sample stream, respectively. However, it will be appreciated that the offset sample streams used in the present invention may be offset from the first sample stream by any desired time offset, and that the applied time offset may or may not be evenly spaced between the offset sample streams.

Figure 6:
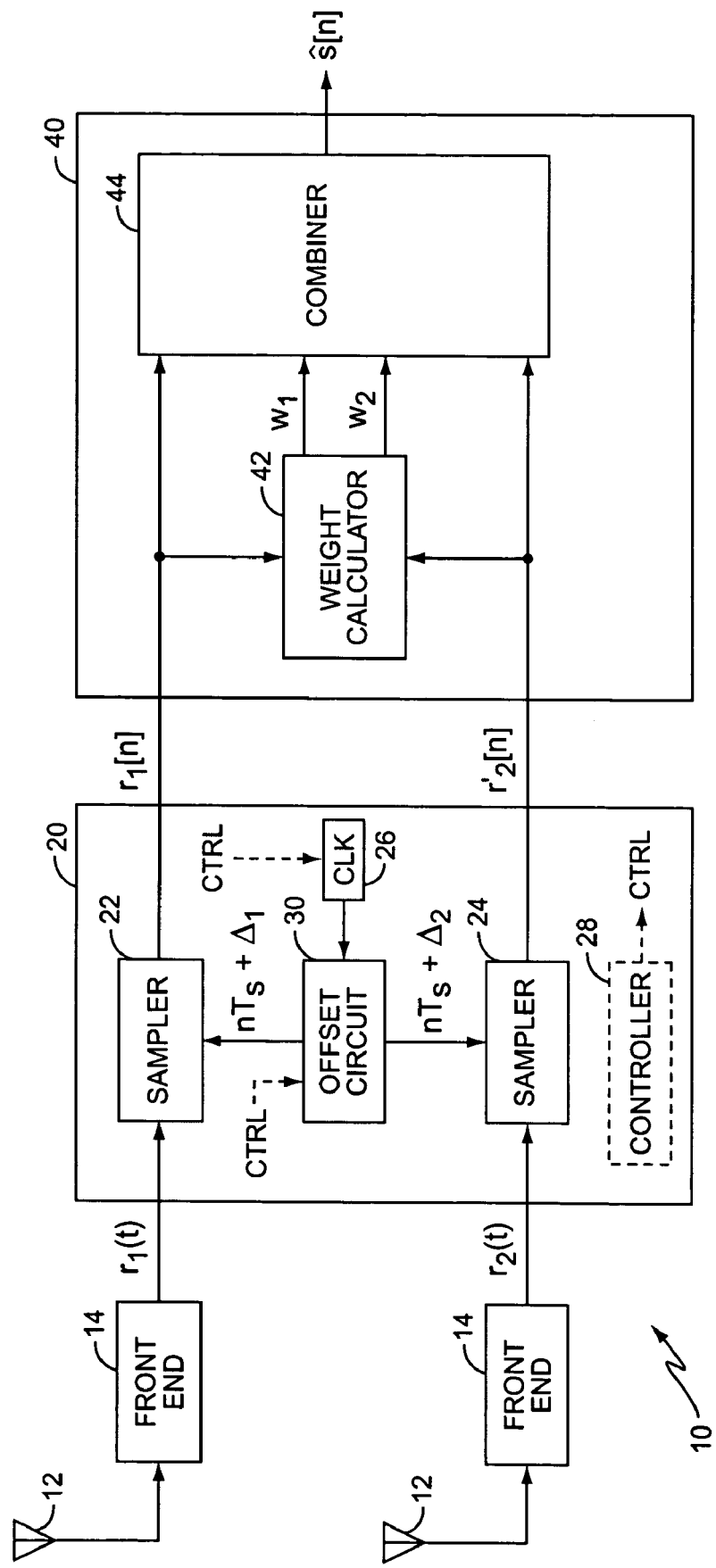
FIG. 6 illustrates another exemplary embodiment of a two-branch wireless receiver according to the present invention.

While the above describes the invention in terms of a fixed offset time $\Delta$ and a fixed sample rate, the present invention is not so limited. For example, as shown in FIG. 6, sampling circuit 20 may include a controller 28 that controls offset circuit 30 to selectively control the offset time $\Delta$ and/or sampling clock 26 to selectively control the sample rate. For example, a multi-branch wireless receiver 10 that includes means to selectively de-activate one or more receiver branches under certain channel conditions, may use controller 28 to vary the offset time $\Delta$ to correspond to the current number of active receiver branches. When four branches are active, controller 28 may control offset times $\Delta_2$, $\Delta_3$, and/or $\Delta_4$ to generate sample streams $r'_2[n]$, $r'_3[n]$, and $r'_4[n]$ offset from the first sample stream $r_1[n]$ by $T_s/4$, $T_s/2$, and $3T_s/4$, respectively. However, in response to the deactivation of one of the four receiver branches, controller 28 may change the offset time $\Delta$ to generate sample streams $r'_2[n]$ and $r'_3[n]$ offset from the first sample stream $r_1[n]$ by $\Delta_2=T_s/3$ and $\Delta_3=2T_s/3$. With multiple branches employing the time-offset method described, a larger timing error is tolerable, thus a longer sampling period, $T_s$, is tolerable. It is then advantageous to be able to reduce the sample rate (lengthen the sampling period) when multiple branches are employed, in order to save resources.

The above-described method and apparatus for canceling interference from signals received by a wireless receiver 10 provides significant advantages over conventional wireless receivers and wireless systems. To illustrate these advantages, the SNR performance of the above-described wireless receiver 10 was simulated using simulated signal samples with a sample time error E of $T_c/8$, where $T_c$ represents the chip period, which corresponds to the distance between adjacent pulses in the received signal. In the SNR performance simulations, a $T_c/8$ time offset $\Delta$ was introduced between the samples of the first sample stream and the samples of the second sample stream. The offset sample streams were scaled and combined, as described above, and the output SNR for the desired signal resulting from the offset sample streams was measured and compared to the output SNR for the desired signal resulting from non-offset ample streams. These SNR performance simulations were repeated for 100 time slots of 100 symbols each, where each simulation used the $T_c/8$ offset time. When compared to the SNR resulting from the non-offset sample streams, the SNR resulting from the offset sample streams showed a consistent 15 dB improvement over a wide range of $E_c/I_{or}$ (energy per chip/total downlink signal energy) values. Those skilled in the art will appreciate that a wireless system may translate this SNR improvement into lower transmit powers, which may further reduce multi-user interference.

Figure 7A:
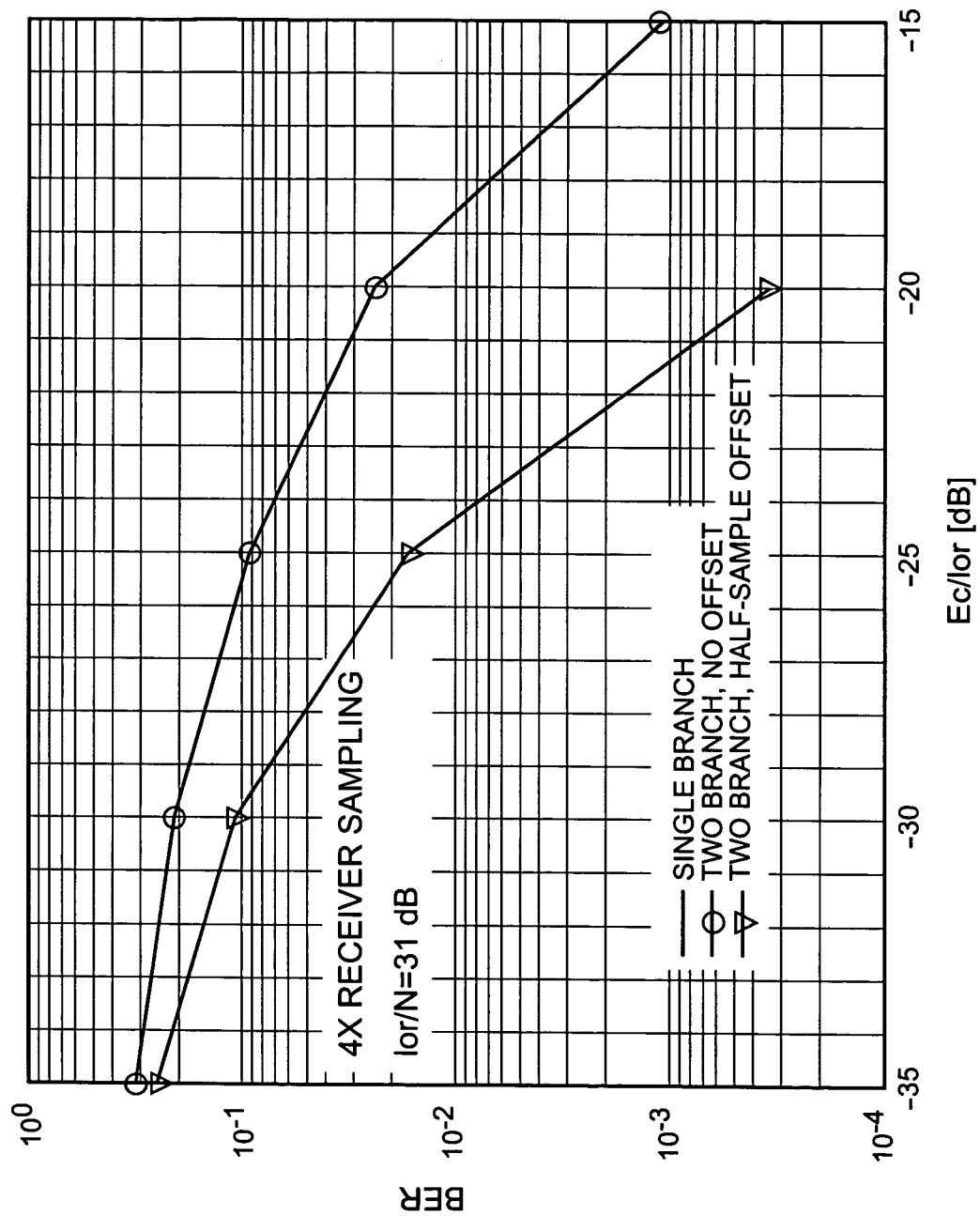
FIGS. 7A-7C illustrate performance results from BER performance simulations for the receiver of FIG. 1.

To further assess the effects of the above-described interference cancellation technique on the Bit Error Rate (BER) of the received signals was evaluated in BER performance simulations. In the BER performance simulations, a simulated pilot channel signal was held at a constant $E_c/I_{or}=-8$ dB, while simulated data channel signals were varied between $-35$ dB and $-15$ dB $E_c/I_{or}$. Further, the BER performance simulations used a non-ideal filter, such as the designed receiver filter response for current WCDMA receivers. As with the SNR performance simulations, the BER performance simulations were repeated for 100 time slots of 100 symbols each, where each simulation used a $T_c/8$ time offset. The results of these BER simulations are shown in FIG. 7A. Under the assumption that the quantization noise is the dominant receiver impairment, the BER performance simulations for the offset sample streams as compared to the non-offset sample streams showed receiver gains in $E_c/I_{or}$ of approximately 4 dB at 10% BER and approximately 6 dB at 1% BER when the receiver sample rate was set at 4 times the chip rate.

Figure 7B:
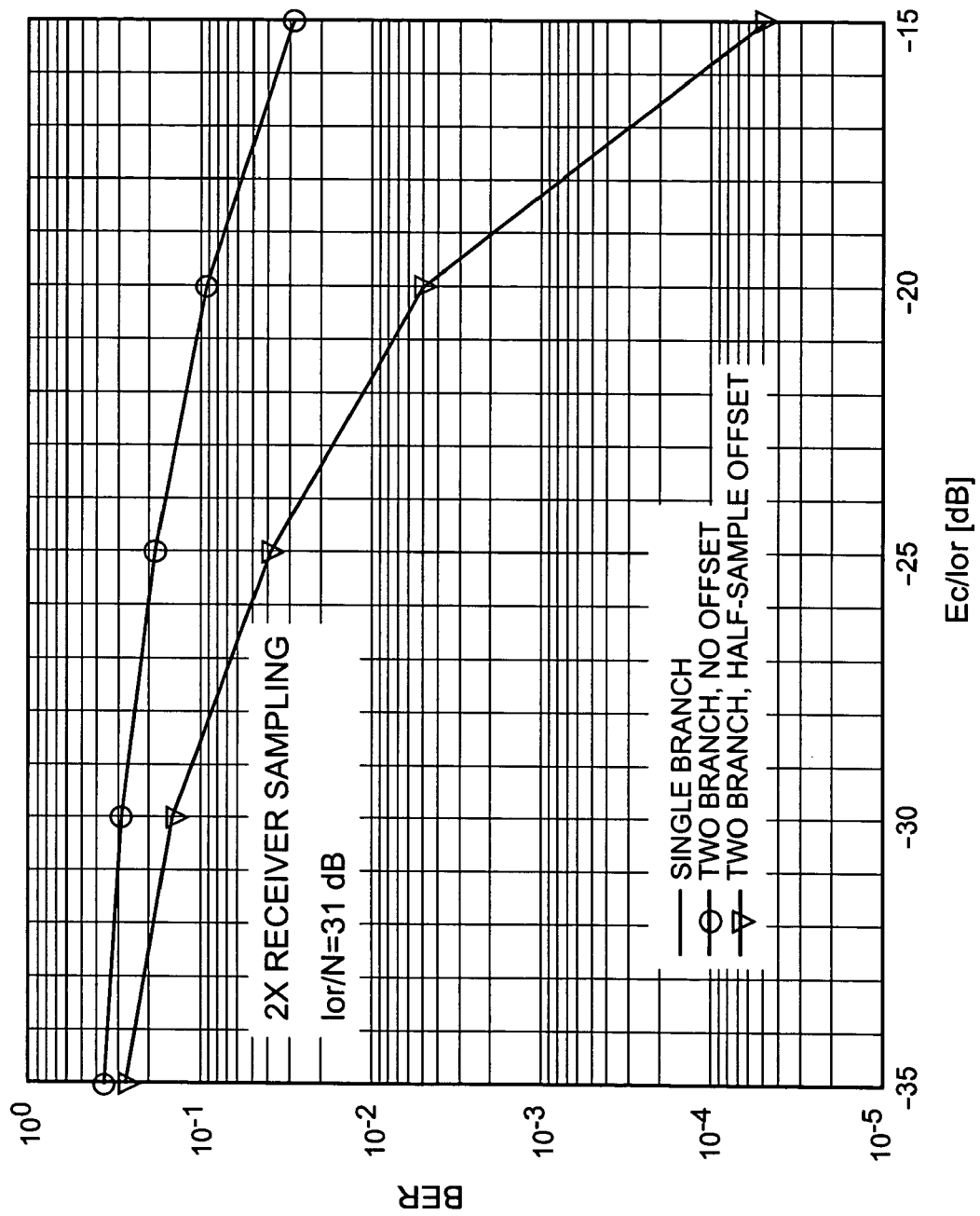

Additional simulations were performed under the same assumptions with a receiver sample rate set at 2 times the chip rate. The results for these BER performance simulation are shown in FIG. 7B. As expected, the results show an overall receiver BER performance degradation due to the lower sample rate. However, these results also show that receiver gains in $E_c/I_{or}$ of approximately 7 dB at 10% BER and approximately 9 dB at 1% BER are achieved by processing the offset sample streams as compared to the processed non-offset sample streams.

Figure 7C:
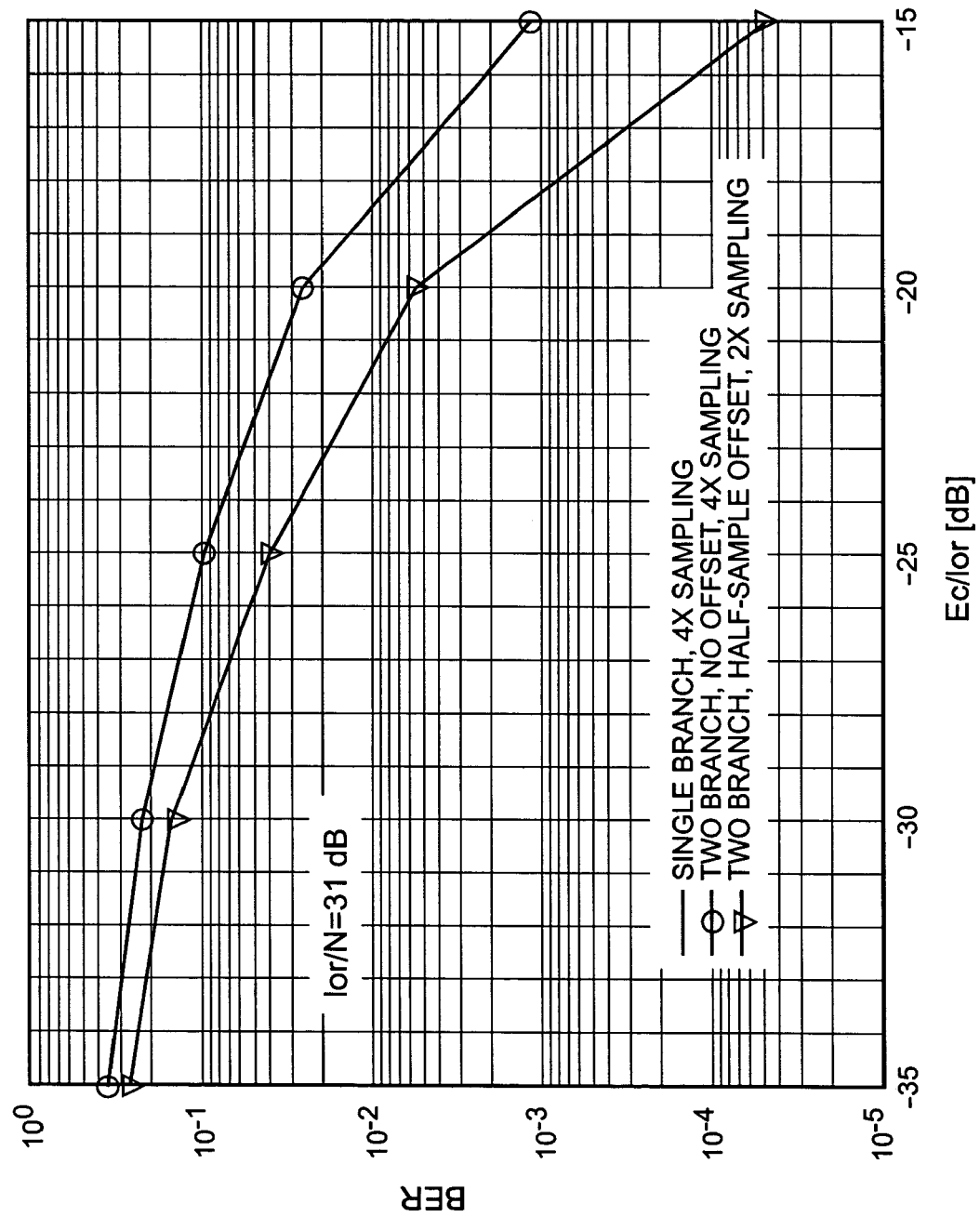

Further BER performance simulations compare the BER resulting from offset sample streams with a sample rate of 2 times the chip rate to the BER resulting from non-offset sample streams with a sample rate of 4 times the chip rate. As shown in FIG. 7C, the offset sample streams with a sample rate of 2 times the chip rate can achieve the same BER at a lower $E_c/I_{or}$ (~3 dB lower) as the non-offset sample streams with a sample rate of 4 times the chip rate. These results indicate that baseband receiver complexity may be reduced without sacrificing receiver performance. In fact, these results indicate that baseband receiver complexity may be reduced while still improving the receiver performance.

In summary, processing offset sample streams reduces the IPI and/or MUI associated with the received signals. This interference reduction improves the performance of wireless receiver 10 by more than 3 dB as compared to conventional wireless receivers. As a result, wireless receiver 10 may require less transmit power and/or may operate at a lower sample rate to achieve a desired received signal quality. A lower transmit power further reduces the effects of MUI and/or enables transmit power resources to be allocated to other wireless receivers, while a lower sample rate reduces the complexity of the wireless receiver 10.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of reducing interference caused by sample time errors in signals received by a multi-branch wireless receiver comprising:
   receiving a first received signal at a first branch of the multi-branch wireless receiver; receiving a second received signal at a second branch of the multi-branch wireless receiver;
   periodically sampling the first received signal at a first sample time to generate a first sample stream by generating the first sample time from a clock signal by identifying an even element of the clock signal as the first sample time;
   periodically sampling the second received signal at a second sample time by offsetting the first sample time by a predetermined time offset to generate a second sample stream comprising an odd element of the clock signal and offset from the first sample stream, wherein the predetermined time offset is $T_s/m$ where $T_s$ represents a sampling period and m represents the number of branches in the multi-branch receiver; and
   combining the offset sample streams from the first and second branches to reduce multi-user interference.

2. The method of claim 1 wherein offsetting the first sample time by the predetermined time offset comprises adding the predetermined time offset to the first sample time to generate the second sample time.

3. The method of claim 1 wherein generating the first sample time from the clock signal comprises identifying a negative edge of the clock signal as the first sample time.

4. The method of claim 3 wherein offsetting the first sample time to generate the second sample time comprises identifying a positive edge of the clock signal as the second sample time.

5. The method of claim 1 further comprising periodically sampling a third received signal at a third sample time.

6. The method of claim 5 wherein the third sample time is offset from at least one of the first and second sample times.

7. The method of claim 5 wherein the third sample time is equal to one of the first and second sample times.

8. The method of claim 1 wherein combining the offset sample streams from the first and second branches to reduce the multi-user interference comprises:
   calculating weighting factors based on the offset sample streams;
   applying the weighting factors to the offset sample streams from the first and second branches to generate weighted sample streams; and
   combining the weighted sample streams to reduce the multi-user interference.

9. The method of claim 8 further comprising despreading the offset sample streams from the first and second branches in first and second sets of RAKE receiver fingers, respectively, to generate respective first and second sets of despread values.

10. The method of claim 9 wherein calculating the weighting factors based on the offset sample streams further comprises calculating the weighting factors based on the first and second sets of despread values.

11. The method of claim 8 further comprising
   despreading the combined sample stream in a set of RAKE fingers to generate a set of despread values; and
   combining the despread values in a RAKE combiner.

12. The method of claim 1 wherein the interference further comprises at least one of inter-symbol interference and inter-chip interference.

13. The method of claim 1 further comprising selectively controlling the predetermined time offset used to generate the offset sample streams.

14. The method of claim 1 wherein combining the offset sample streams from the first and second branches comprises combining the offset sample streams from the first and second branches using one of a minimum mean square error combining method and a maximum likelihood combining method to reduce the multi-user interference.

15. A multi-branch wireless receiver comprising: a first branch to receive a first received signal;
   a second branch to receive a second received signal; a sampling circuit comprising an offset circuit comprising a selector circuit that identifies an even time element of the clock signal as a first sample time and an odd time element of the clock signal as a second sample time, wherein the second sample time is offset from the first sample time by a predetermined time offset, wherein the predetermined time offset is $T_s/m$, where $T_{s33}$ represents a sampling period and m represents the number of branches in the multi-branch receiver, wherein the sampling circuit is configured to periodically sample the first and second received signals at the first and second sample times, respectively, to generate offset sample streams, and wherein the sampling circuit further comprises: a first sampler to periodically sample the first received signal at the first sample time to generate a first sample stream; and
   a second sampler to periodically sample the second received signal at the second sample time to generate a second sample stream offset from the first sample stream; and a combining circuit to combine the offset sample streams from the first and second branches to reduce multi-user interference in the received signals caused by sample time errors in the first and second branches.

16. The multi-branch wireless receiver of claim 15 wherein the offset circuit comprises:
   a delay controller to generate the predetermined time offset; and
   a delay element to add the predetermined time offset to the first sample time to generate the second sample time offset from the first sample time.

17. The multi-branch wireless receiver of claim 15 wherein the selector circuit identifies a negative edge of the clock signal as the first time element and a positive edge of the clock signal as the second time element.

18. The multi-branch wireless receiver of claim 15 wherein at least one of the first and second samplers comprise an analog-to-digital converter.

19. The multi-branch wireless receiver of claim 15 wherein at least one of the first and second samplers comprise an oversample and decimate system.

20. The multi-branch wireless receiver of claim 15 further comprising a third sampling circuit to periodically sample a third received signal at a third sample time to generate a third sample stream.

21. The multi-branch wireless receiver of claim 20 wherein the third sample time is offset from at least one of the first and second sample times.

22. The multi-branch wireless receiver of claim 20 wherein the third sample time is equal to one of the first and second sample times.

23. The multi-branch wireless receiver of claim 15 wherein the combining circuit comprises:
   a weight calculator to calculate weighting factors based on the offset sample streams; and a combiner to apply the weighting factors to the offset sample streams from the first and second branches and to combine the weighted sample streams to reduce the multi-user interference.

24. The multi-branch wireless receiver of claim 23 wherein the multi-branch wireless receiver comprises a narrowband receiver.

25. The multi-branch wireless receiver of claim 23 wherein the combining circuit further comprises a RAKE receiver comprising:
   one or more RAKE fingers to despread the combined sample stream to generate a set of despread values;
   a RAKE weight calculator to calculate RAKE weighting factors based on the set of despread values; and
   a RAKE combiner to apply the RAKE weighting factors to the despread values and to combine the weighted despread values.

26. The multi-branch wireless receiver of claim 15 wherein the combining circuit comprises a RAKE receiver for combining the offset sample streams to reduce multi-user interference, the RAKE receiver comprising:
   a weight calculator to calculate weighting factors based on the offset sample streams; and
   a combiner to apply the weighting factors to despread values generated from the offset sample streams from the first and second branches and to combine the weighted despread values to reduce the multi-user interference.

27. The multi-branch wireless receiver of claim 26 wherein the RAKE receiver further comprises:
   a first set of RAKE fingers to despread the first sample stream to generate a first set of despread values;
   a second set of RAKE fingers to despread the offset second sample stream to generate a second set of despread values; and
   wherein the weight calculator further calculates the weighting factors based on the first and second sets of despread values.

28. The multi-branch wireless receiver of claim 15 wherein the wireless receiver is disposed in at least one of a base station and a mobile station.

29. The multi-branch wireless receiver of claim 15 wherein the multi-branch wireless receiver comprises a two-branch wireless receiver.

30. The multi-branch wireless receiver of claim 15 wherein the multi-branch wireless receiver is disposed in a WCDMA communication system.

31. The multi-branch wireless receiver of claim 15 wherein the sampling circuit further comprises a controller and wherein the controller selectively controls the offset circuit to selectively control the predetermined time offset between the first sample time and the second sample time.

32. The multi-branch wireless receiver of claim 15 wherein the combining circuit comprises one of a minimum mean square error combining circuit and a maximum likelihood combining circuit.

33. A multi-branch wireless receiver comprising:
   an offset circuit to offset a first sample time and a second sample time by a predetermined time offset, wherein the offset circuit comprises a selector circuit that identifies an even element of a clock signal as the first sample time and an odd element of the clock signal as the second sample time offset form the first sample time;
   a first analog-to digital converter corresponding to a first branch of the multi-branch wireless receiver to periodically sample a first received signal at the first sample time to generate a first sample stream; and
   a second analog-to-digital converter corresponding to a second branch of the multi-branch wireless receiver to periodically sample a second received signal at the second sample time offset from the first sample time by the predetermined time offset to generate a second sample stream time offset from the first sample stream, wherein the predetermined time offset is $T_s/m$, where $T_s$ represents a sampling period and m represents the number of branches in the multi-branch receiver; and
   a combining circuit to combine the offset sample streams from the first and second branches to reduce multi-user interference caused by sample time errors in the first and second branches.

34. The multi-branch wireless receiver of claim 33 wherein the offset circuit comprises:
   a delay controller to define the predetermined time offset; and
   a delay element to apply the predetermined time offset to the first sample time to generate the second sample time offset from the first sample time.

35. The multi-branch wireless receiver of claim 33 wherein the selector circuit that identifies a negative edge of the clock signal as the first sample time and a positive edge of the clock signal as the second sample time offset from the first sample time.

36. The multi-branch wireless receiver of claim 33 wherein the combining circuit comprises:
   a weighting calculator to calculate weighting factors based on the offset sample streams; and
   a combiner to apply the weighting factors to the offset sample streams from the first and second branches and to combine the weighted sample streams to reduce the multi-user interference.

37. The multi-branch wireless receiver of claim 36 wherein the multi-branch wireless receiver comprises a narrowband receiver.

38. The multi-branch wireless receiver of claim 36 wherein the combining circuit further comprises a RAKE receiver comprising:
   one or more RAKE fingers to despread the combined sample stream to generate a set of despread values;
   a RAKE weight calculator to calculate RAKE weighting factors based on the set of despread values; and
   a RAKE combiner to apply the RAKE weighting factors to the despread values and to combine the weighted despread values.

39. The multi-branch wireless receiver of claim 33 wherein the combining circuit comprises a RAKE receiver for combining the offset sample streams from the first and second branches to reduce multi-user interference, the RAKE receiver comprising:
   a weight calculator to calculate weighting factors based on the offset sample streams; and
   a combiner to apply the weighting factors to despread values generated from the offset sample streams from the first and second branches and to combine the weighted despread values to reduce the multi-user interference.

40. The multi-branch wireless receiver of claim 39 wherein the RAKE receiver further comprises:
   a first set of RAKE fingers to despread the first sample stream to generate a first set of despread values;
   a second set of RAKE fingers to despread the offset second sample stream to generate a second set of despread values; and wherein the weight calculator further calculates the weighting factors based on the first and second sets of despread values.

41. The multi-branch wireless receiver of claim 33 wherein the wireless receiver is disposed in at least one of a base station and a mobile station.

42. The multi-branch wireless receiver of claim 33 wherein the multi-branch wireless receiver is disposed in a WCDMA communication system.

43. The multi-branch wireless receiver of claim 33 wherein the multi-branch wireless receiver comprises a two-branch wireless receiver.

44. The multi-branch wireless receiver of claim 33 wherein the combining circuit comprises one of a minimum mean square error combining circuit and a maximum likelihood combining circuit.

* * * * *

UNITED STATES PATENT AND TRADEMARK OFFICE
CERTIFICATE OF CORRECTION

PATENT NO. : 7,924,909 B2  Page 1 of 1
APPLICATION NO. : 10/858787
DATED : April 12, 2011
INVENTOR(S) : Fulghum It is certified that error appears in the above-identified patent and that said Letters Patent is hereby corrected as shown below:

In Column 5, Line 64, delete "$r_1, [n]$" and insert -- $r_1[n]$ --, therefor.

In Column 6, Line 29, delete "n T" and insert -- $nT_s$ --, therefor.

In Column 7, Line 34, delete "$\hat{s}[n]$" and insert -- $\hat{s}[n],$ --, therefor.

In Column 9, Line 55, delete "E" and insert -- ε --, therefor.

Signed and Sealed this
Thirteenth Day of December, 2011

David J. Kappos
*Director of the United States Patent and Trademark Office*